US006771524B2

United States Patent
Miguchi

(10) Patent No.: US 6,771,524 B2
(45) Date of Patent: Aug. 3, 2004

(54) MULTIPLE PWM CYCLOCONVERTER

(75) Inventor: Yasuhiko Miguchi, Chiba-ken (JP)

(73) Assignee: Otis Elevator Company, Farmington, CT (US)

( * ) Notice: Subject to any disclaimer, the term of this patent is extended or adjusted under 35 U.S.C. 154(b) by 8 days.

(21) Appl. No.: 10/328,627

(22) Filed: Dec. 23, 2002

(65) Prior Publication Data
US 2003/0137855 A1 Jul. 24, 2003

(30) Foreign Application Priority Data
Dec. 27, 2001 (JP) .......................................... 2001-403131

(51) Int. Cl.⁷ ............................................... H02M 5/00
(52) U.S. Cl. ....................................... 363/149; 363/159
(58) Field of Search ................................. 363/148, 149, 363/127, 157, 123, 131, 159

(56) References Cited

U.S. PATENT DOCUMENTS 5,949,672 A  *  9/1999  Bernet .......................... 363/159
6,163,472 A  * 12/2000  Colby ........................... 363/127
6,603,647 B2 *  8/2003  Briesen et al. ............... 361/91.1

* cited by examiner

Primary Examiner—Shawn Riley

(57) ABSTRACT

A multiple PWM cycloconverter or matrix converter uses reactors to connect various phase output terminals in parallel.

3 Claims, 5 Drawing Sheets

MULTIPLE PWM CYCLOCONVERTER

BACKGROUND OF THE INVENTION

This invention pertains to a PWM cycloconverter or matrix converter using multiple converters arranged in parallel and coupled by a reactive element.

FIG. 6 illustrates an example of a conventional PWM cycloconverter or matrix converter. In FIG. 6, (1) represents a 3-phase AC power source; (2) represents an LC filter; (3) represents a converter composed of nine bi-directional switches (10); and (4) represents a load. For example, the bi-directional switches (10) that form converter (3) may have the constitution shown in FIG. 7. In FIG. 7, (5) and (6) represent unidirectional IGBTs (insulating gate bipolar transistor), and (7) and (8) represent diodes. Each bi-directional switch (10) can turn ON/OFF current either direction under gate signals.

The voltage type PWM converter/PWM inverter system shown in FIG. 8 was developed a long time ago, and many products, ranging from those with small capacity to those with large capacity have been manufactured.

However, in order to rectify an AC input to DC with a converter and then to convert the DC to AC with an inverter, DC capacitors (9) are needed. However, DC capacitors not only occupy a certain space, for electrolytic capacitors, their lifetime is a problem.

On the other hand, for a PWM cycloconverter, there is no need to use DC capacitors, and there is no problem with respect to lifetime. However, it is still under study and there are only reports on small-capacity equipment at the laboratory level (for example, S. Ishii, E. Yamamoto, H. Hara, E. Wantanata, A. M. Hava, and X. Xia, "A Vector Controlled High Performance Matrix Converter—Induction Motor Drive", Conference record of IPEC-Tokyo, pp. 235–240. April, 2000).

For a PWM cycloconverter, it is necessary to avoid an open circuit of the output terminals and a short circuit on the input side. A high-current stack containing a snubber is formed but this is difficult to realize in principle. As a result, it is difficult to manufacture a converter with a high capacity. This is undesired. The objective of this invention is to solve the aforementioned problems.

SUMMARY OF THE INVENTION

In order to solve the aforementioned problems, the invention described herein provides a type of multiple PWM cycloconverter with the following constitution: for p unit converters of an n-input/m-output PWM cycloconverter composed of n*m bi-directional switches (n, m and p are integers of 2 or larger, respectively), the various phase output terminals are connected in parallel via reactors, and there are m output terminals in all.

The reactors for parallel connection may share a core for each output terminal and a current sensor is set for each output phase of each unit converter to detect current, and the output voltage command for each unit converter is corrected corresponding to a current unbalance.

According to this invention, plural PWM cycloconverters (matrix converters) are set in parallel via reactors. Consequently, a large-capacity converter is realized. Because for a PWM cycloconverter, an AC input is directly converted to an AC output, there is no need to use capacitors in the DC link portion. As a result, the size and cost of the converter can be reduced. Also, it is free of problems pertaining to lifetime. Also, there is no need to have a capacitor preparatory charging circuit before the start of operation.

BEST MODE FOR CARRYING OUT THE INVENTION

In the following, embodiments of this invention will be described in detail with reference to FIGS. 1–5.

Figure 1:
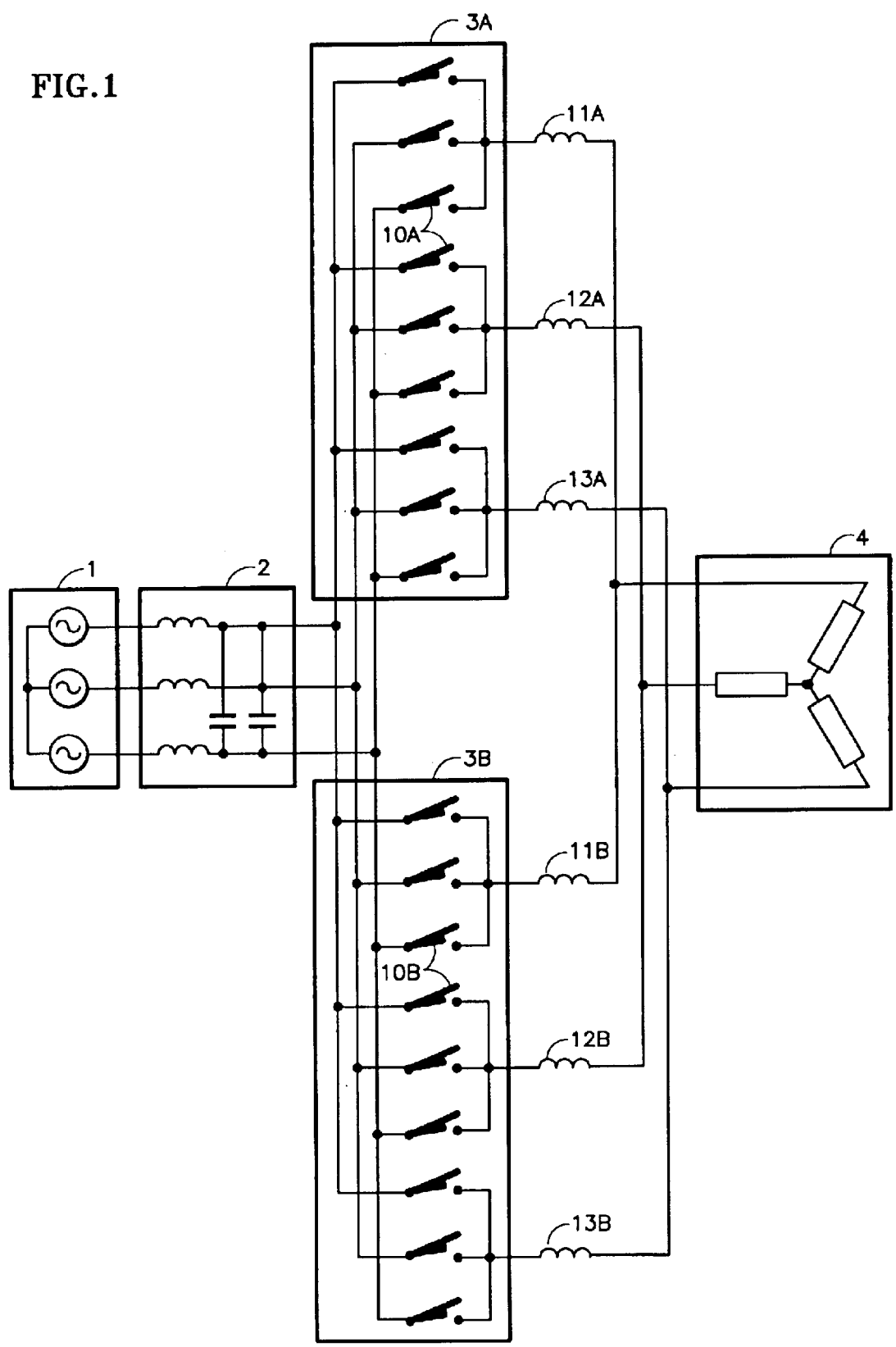
FIG. 1 is a diagram illustrating a first embodiment of a multiple PWM matrix converter according to the subject invention.
Figure 6:
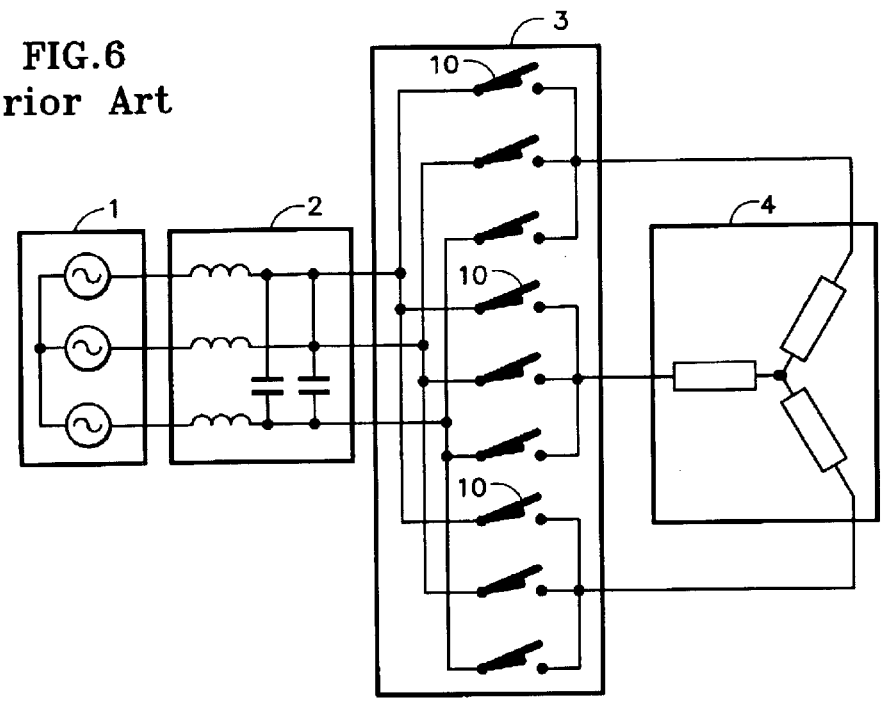
FIG. 6 is a diagram illustrating a single prior art PWM matrix converter.
Figure 7:
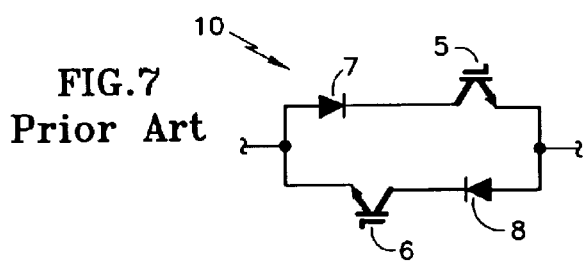
FIG. 7 is a diagram illustrating a prior art bi-directional switch used in the PWM matrix converter shown in FIG. 6.
Figure 8:
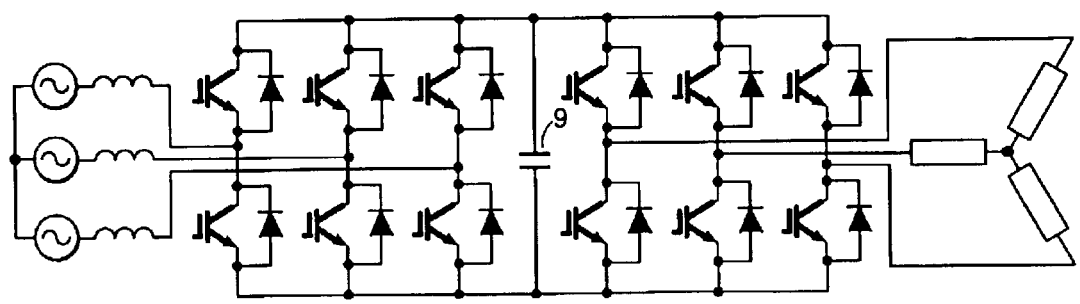
FIG. 8 is a diagram illustrating a prior art PWM converter/PWM inverter.

FIG. 1 is a diagram illustrating a first embodiment of this invention. The same part numbers as those used in FIG. 6 are used in FIG. 1. Consequently, there is no need to explain them again. In FIG. 1, (3A) and (3B) represent unit matrix converters. Each of them is a 3-input/3-output converter composed of nine bidirectional switches (10). Reactors (11A), (11B), (12A), (12B), (13A), (13B) connect the a-phase, b-phase, and c-phase of said unit converters (3A), (3B) in parallel. The output currents of said two unit converters (3A), (3B) are synthesized by means of these reactors, and the synthesized current is fed to load (4). By means of such parallel connection, a current about twice the current of the unit converter 3A and 3B can be fed, and a large-capacity load can be driven.

Figure 2:
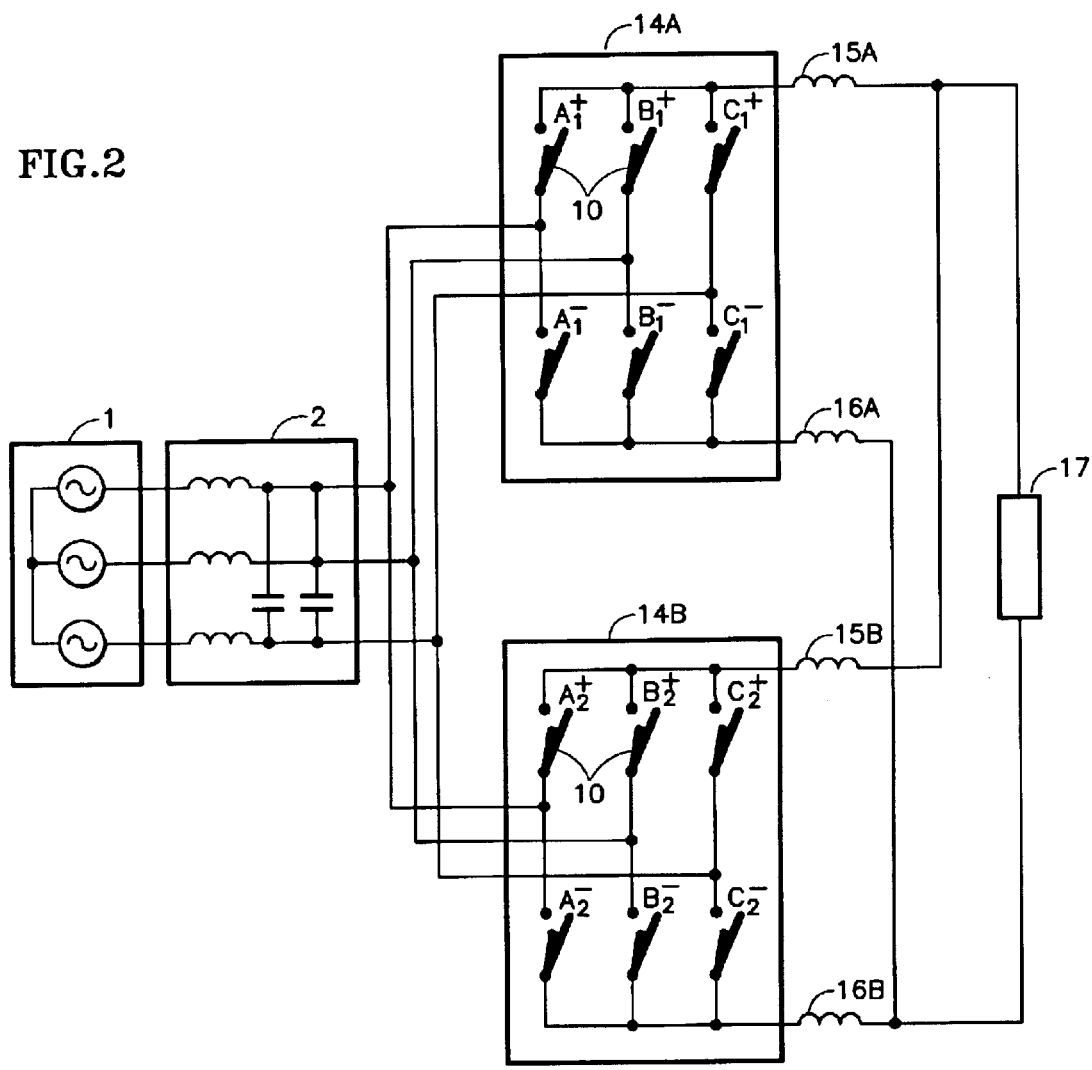
FIG. 2 is a diagram illustrating a second embodiment of a multiple PWM matrix converter according to the subject invention.

FIG. 2 is a diagram illustrating a second embodiment of this invention. The same part numbers of FIG. 6 are used in FIG. 2. Consequently, they are not explained again. In FIG. 2, (14A) and (14B) represent 3-input/2-output PWM cycloconverters (matrix converters) each composed of six bidirectional switches. (15A), (15B), (16A), (16B) represent reactors for connecting the outputs of unit converters (14A) and (14B) in parallel. (17) represents a single-phase AC load or a DC load. In this embodiment, too, a larger current can be fed by means of parallel connection.

Figure 3:
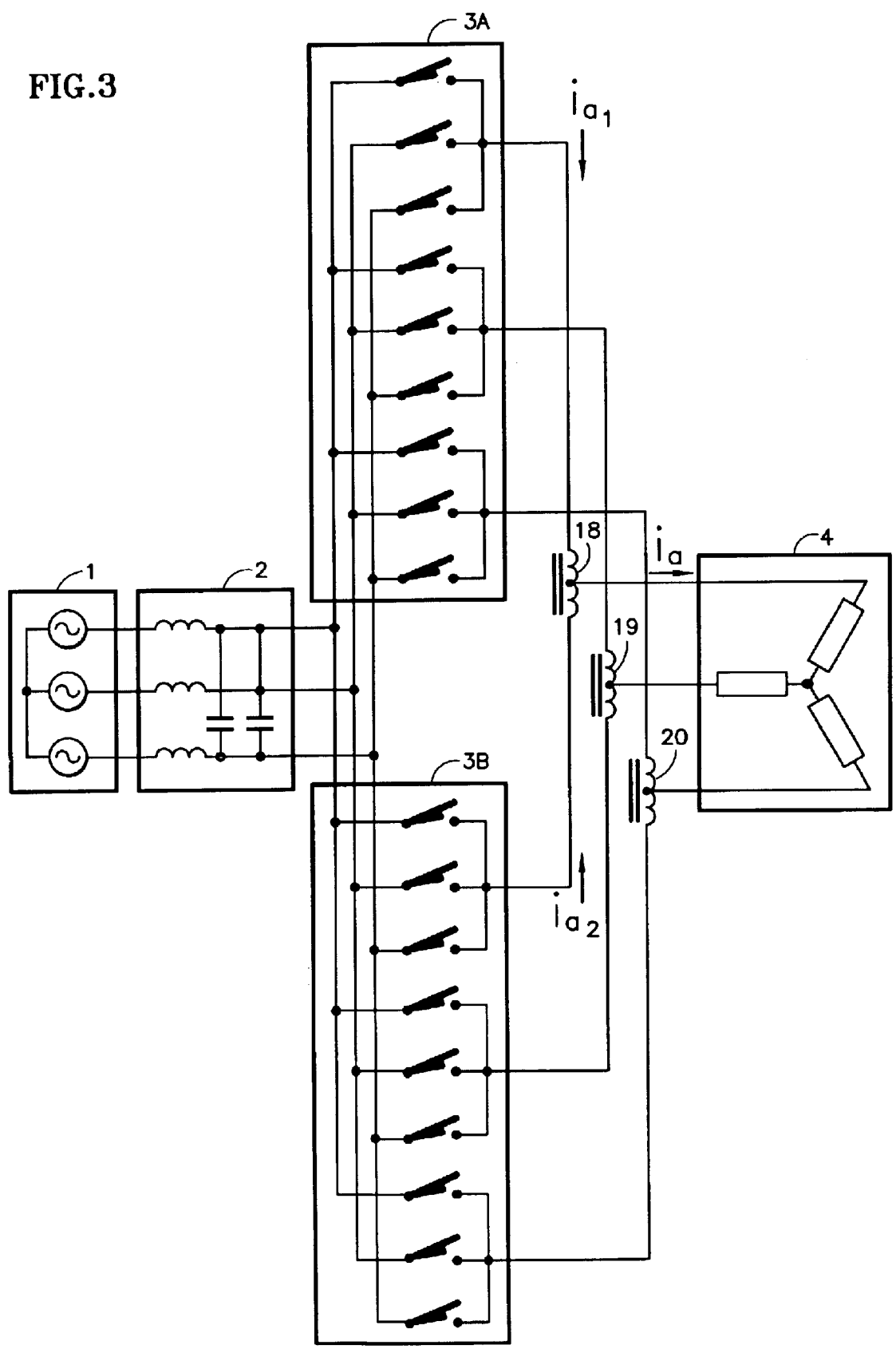
FIG. 3 is a diagram illustrating a third embodiment of a multiple PWM matrix converter according to the subject invention.

The same part numbers as those used in FIG. 1 are used in FIG. 3. Consequently, they will not be explained again. In FIG. 3, (18), (19), (20) represent reactors that connect the outputs of the various phases of unit converters (3A), (3B) in parallel. Each of them is prepared by winding the coil as output of each converter on a single iron core.

Figure 4:
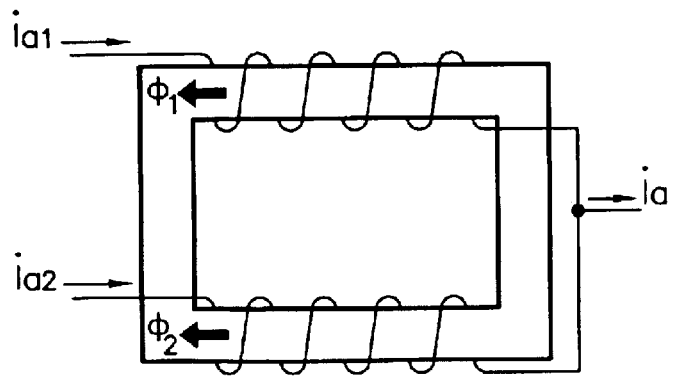
FIG. 4 is a diagram illustrating an iron core-shared reactor.

FIG. 4 is a diagram illustrating an example of reactor (18). For the reactor shown in FIG. 4, magnetic flux $\phi_1$ due to load current $i_{a1}$ of unit converter (3A) and magnetic flux $\phi_2$ due to load current $i_{a2}$ of unit converter (3B) almost cancel each other. Consequently, one may design the iron core in consideration of the maximum value of lateral current $i_{a1}-i_{a2}$ between the converters. Consequently, the obtained reactors are smaller and less costly than reactors (11A), (11B) in the application example shown in FIG. 1.

Figure 5:
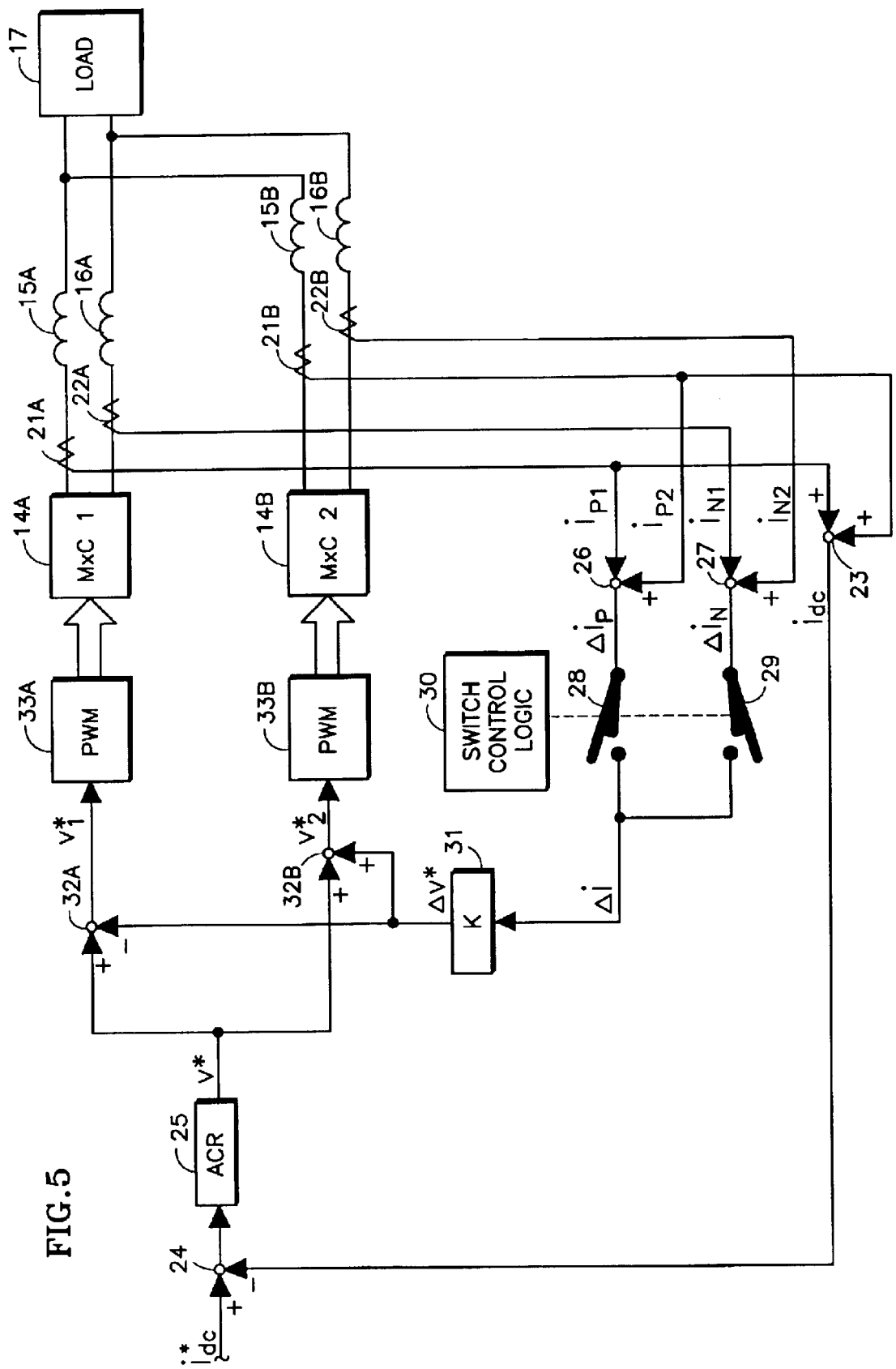
FIG. 5 is a diagram illustrating a fourth embodiment of a multiple PWM matrix converter according to the subject invention.

FIG. 5 is a diagram illustrating a fourth embodiment of this invention.

Even when the same gate signal from a single controller is applied on the bi-directional switches of the various unit converters, because there is dispersion in the forward voltage drop among the various switch elements and dispersion in the turn-ON time and turn-OFF time of the various switch elements, there may be unbalance with respect to the output current sharing of unit converters. This embodiment is an example for current balance control. In this case, current balance control is performed in the case when DC is output from two 3-input/2-output PWM cycloconverters.

The same part numbers as those in FIG. 2 are used in FIG. 5. Consequently, there is no need to explain them again. In FIG. 5, (21A) and (22A) represent current sensors that detect output currents $i_{P1}$, $i_{N1}$ of first unit converter (14A), and (21B) and (22B) represent current sensors for detecting output currents $i_{P2}$ and $i_{N2}$ of second unit converter (14B). (23) represents an adder that adds $i_{P1}$ and $i_{P2}$ to get overall output current $i_{dc}$ of the multiple PWM cycloconverter. (24) represents a subtracter that calculates the difference between current command $i_{dc}*$ and output current $i_{dc}$. The output of subtracter (24) is input to current controller (25), and voltage command v* with respect to the overall converter is output. (26) represents a subtracter that calculates difference $\Delta i_P$ between P side output current $i_{P1}$ of converter (1) and P side output current $i_{P2}$ of converter (2). (27) represents a subtracter that calculates difference $\Delta i_N$ between N side output current $i_{N1}$ of converter (1) and N side output current $i_{N2}$ of converter (2). (28) and (29) represent switches controlled by switch control logic (30), and they work in a complementary way. When switch (28)=ON and switch (29)=OFF, one has $$\Delta i = \Delta i_P$$

When switch (28)=OFF and switch (29)=ON, one has $$\Delta i = \Delta i_N.$$

(31) represents a current deviation amplifier. With current deviation $\Delta i$ as input, it outputs voltage correction command $\Delta v*$. (32A) and (32B) represent a subtracter and adder, respectively. Voltage command v* is corrected by means of formula $$v*_1 = v* - \Delta v*$$

$$v*_2 = v* + \Delta v*$$

with voltage command $v*_1$ for the first converter and voltage command $v*_2$ for the second converter. Voltage commands $v*_1$ and $v*_2$ are input to PWM (pulse width modulation) logics (33A), (33B), and the gate signals for the bi-directional switches of converters (14A), (14B) are sent from (33A), (33B).

In the following, operation of switch selecting logic (30) is described in more detail. Corresponding to the output voltage commands and input current commands, 3-input/2-output PWM cycloconveters (14A), (14B), shown in more detail in FIG. 2, are subject to pulse width modulation of any of the following 6 types.

(I) $A_1^+$=ON, $B_1^+$=$C_1^+$=OFF, PWM with time distributed to $A_1^-$, $B_1^-$, $C_1^-$ (at each time, one is ON, while the remaining two are OFF) $A_2^-$=ON, $B_2^+$=$C_2^+$=OFF, PWM with time distributed to $A_2^-$, $B_2^-$, $C_2^-$ (II) $C_1^-$=ON, $A_1^-$=$B_1^-$=OFF, PWM with time distributed to $A_1^+$, $B_1^+$, $C_1^+$ $C_2^-$=ON, $A_2^-$=$B_2^-$=OFF, PWM with time distributed to $A_2^+$, $B_2^+$, $C_2^+$ (III) $B_1^+$=ON, $A_1^+$=$C_1^+$=OFF, PWM with time distributed to $A_1^-$, $B_1^-$, $C_1^-$ $B_2^+$=ON, $A_2^+$=$C_2^+$=OFF, PWM with time distributed to $A_2^-$, $B_2^-$, $C_2^-$ (IV) $A_1^-$=ON, $B_1^-$=$C_1^-$=OFF, PWM with time distributed to $A_1^+$, $B_1^+$, $C_1^+$ $A_2^-$=ON, $B_2^-$=$C_2^-$=OFF, PWM with time distributed to $A_2^+$, $B_2^+$, $C_2^+$ (V) $C_1^+$=ON, $A_1^+$=$B_1^+$=OFF, PWM with time distributed to $A_1^-$, $B_1^-$, $C_1^-$ $C_2^+$=ON, $A_2^+$=$B_2^+$=OFF, PWM with time distributed to $A_2^-$, $B_2^-$, $C_2^-$ (VI) $B_1^-$=ON, $A_1^-$=$C_1^-$=OFF, PWM with time distributed to $A_1^+$, $B_1^+$, $C_1^+$ $B_2^-$=ON, $A_2^-$=$C_2^-$=OFF, PWM with time distributed to $A_2^+$, $B_2^+$, $C_2^+$ In cases (I), (III), (V), because P side reactors (15A) and (15B) are connected to the same phase of the AC input, during the period when these modulations are performed, there is no change in currents $i_{P1}$, $i_{P2}$. It is possible to adjust the times for allotting the average voltage applied on N side reactors (16A), (16B) to $A_1^-$, $B_1^-$, $C_1^-$, and the times allotted to $A_2^-$, $B_2^-$, $C_2^-$, in a direction to reduce $\Delta i_N = i_{N1} - i_{N2}$. In this period, separate selecting logic (30) selects switch (29), and one has $\Delta i = \Delta i_N$.

On the other hand, in cases (II), (IV), (VI), because N side reactors (16A) and (16B) are connected to the same phase of the AC input, during the period when these modulations are performed, there is no change in currents $i_{N1}$, $i_{N2}$. It is possible to adjust the times for allotting the average voltage applied on P side reactors (15A), (15B) to $A_1^+$, $B_1^+$, $C_1^+$, and the times allotted to $A_2^+$, $B_2^+$, $C_2^+$, in a direction to reduce $\Delta i_P = i_{P1} - i_{P2}$. In this period, separate selecting logic (30) selects switch (28), and one has $\Delta i = \Delta i_P$.

As explained above, in this application example, corresponding to PWM switching, during the period when there is no change in the N side reactor current, P side current deviation $\Delta i_P$ is connected to current deviation amplifier (31). During the period when there is no change in the P side reactor current, N side current deviation $\Delta i_N$ is connected to current deviation amplifier (31), and current balance control is performed. Consequently, for the overall system, on both the P side and N side, current is controlled in balance.

In the above, we have discussed an example of current balance control of a double PWM cycloconverter. However, other multiple PWM cycloconverters may be used. For example, for a triple PWM cycloconverter, one may just add the following functions: the current deviation of converter (1) and converter (2) is used to correct the voltage commands for converter (1) and converter (2), and the current deviation of converter (2) and converter (3) is used to correct the voltage commands of converter (2) and converter (3). In addition, the current deviation of converter (3) and converter (1) is used to correct the voltage commands of converter (3) and converter (1).

For a multiple number larger than 3, one may use the current deviation of converter (k) and converter (k+1) to correct the current commands of converter (k) and converter (k+1).

As explained above, according to this invention, plural PWM cycloconverters (matrix converters) are set in parallel by means of reactors to form a large-capacity converter. Consequently, there is no need to use a DC link, and it is possible to form a large-capacity PWM cycloconverter with various features, e.g., power source side power factor of unity and ability of regeneration.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A multiple PWM cycloconverter having multiple converters, the converters having multiple bi-directional switches, inputs, and outputs, each output having an output phase associated therewith, the multiple PWM cycloconverter comprising:

a reactor for each one of the multiple outputs of each converter, each reactor for the outputs having the same output phase being connected in parallel.

2. The multiple PWM cycloconverter of claim 1, each of the reactors connected in parallel further comprising a common core.

3. The multiple PWM cycloconverter of claim 1 comprising a current sensor for each one of the multiple outputs to detect an output current of each one of the multiple outputs to control switching of the bid-directional switches.

* * * * *